(12) United States Patent
Tachibana et al.

(10) Patent No.: US 7,343,401 B2
(45) Date of Patent: Mar. 11, 2008

(54) REMOTE MAINTENANCE APPARATUS, TERMINAL CONNECTED TO THE APPARATUS AND COMPUTER READABLE MEDIUM FOR REALIZING THE APPARATUS AND THE TERMINAL

(75) Inventors: Ikuko Tachibana, Kawasaki (JP); Akira Ohtsuka, Kawasaki (JP); Hideki Ise, Kawasaki (JP); Kazuhiro Matsushita, Itano (JP); Hideki Yoshida, Kawasaki (JP); Kazuhiko Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 745 days.

(21) Appl. No.: 09/813,962

(22) Filed: Mar. 22, 2001

(65) Prior Publication Data

US 2001/0029529 A1    Oct. 11, 2001

(30) Foreign Application Priority Data

Mar. 31, 2000    (JP)    ............................. 2000-096557

(51) Int. Cl.
*G06F 15/177*    (2006.01)

(52) U.S. Cl. ............... 709/220; 709/221; 709/222; 709/223; 714/2; 714/4; 714/100; 717/168; 717/170

(58) Field of Classification Search ........ 709/220–223, 709/226, 242, 249
See application file for complete search history.

(56) References Cited

U.S. PATENT DOCUMENTS

| | | | | |
|---|---|---|---|---|
| 5,655,068 A | * | 8/1997 | Opoczynski | 714/4 |
| 5,812,748 A | * | 9/1998 | Ohran et al. | 714/4 |
| 5,893,005 A | | 4/1999 | Ogura | |
| 5,961,594 A | * | 10/1999 | Bouvier et al. | 709/223 |
| 6,115,393 A | * | 9/2000 | Engel et al. | 370/469 |
| 6,229,540 B1 | * | 5/2001 | Tonelli et al. | 345/735 |
| 6,282,175 B1 | | 8/2001 | Steele et al. | |
| 6,308,206 B1 | | 10/2001 | Singh | |
| 6,427,170 B1 | * | 7/2002 | Sitaraman et al. | 709/226 |
| 6,594,695 B1 | * | 7/2003 | Vasamsetti et al. | 709/220 |
| 6,816,944 B2 | * | 11/2004 | Peng | 711/133 |
| 6,826,715 B1 | * | 11/2004 | Meyer et al. | 714/37 |
| 2002/0188706 A1 | * | 12/2002 | Richards et al. | 709/223 |
| 2003/0005107 A1 | * | 1/2003 | Dulberg et al. | 709/223 |

FOREIGN PATENT DOCUMENTS

| | | |
|---|---|---|
| JP | 06-028222 | 2/1994 |
| JP | 06-089382 | 3/1994 |
| JP | 8-331355 | 12/1996 |
| JP | 09-212551 | 8/1997 |
| JP | 09-289508 | 11/1997 |
| JP | 10-124346 | 5/1998 |
| JP | 11-134179 | 5/1999 |
| JP | 11-167540 | 6/1999 |
| JP | 11-194961 | 7/1999 |
| JP | 2000-003347 | 1/2000 |
| JP | 2000-048078 | 2/2000 |

* cited by examiner

*Primary Examiner*—Niketa Patel
(74) *Attorney, Agent, or Firm*—Staas & Halsey LLP

(57) ABSTRACT

A remote maintenance apparatus is provided. The remote maintenance apparatus includes: a first obtaining part which obtains configuration information of terminals sent from the terminals; a storing part which stores the configuration information while bringing the configuration information into correspondence with generation information; a second obtaining part which obtains configuration information of a failed terminal; and an extraction part which extracts difference information between configuration information obtained by the second obtaining part and configuration information stored in the storing part which has older generation.

5 Claims, 18 Drawing Sheets

FIG.3

USER INFORMATION INPUT SCREEN

COMPANY NAME
SECTION NAME
ADDRESS
NAME OF BUILDING
ADMINISTRATOR
ADMINISTRATOR E-MAIL
ZIP CODE
TELEPHONE NUMBER
FAX NUMBER
UNIQUE NAME

OK
CANCEL

FIG.4A

| APPARATUS ID | SERIES NAME |
|---|---|

FIG.4B

HARDWARE NAME
HARDWARE VERSION
SERIAL NUMBER
LOCATION
•
•
•
•
SOFTWARE NAME
SOFTWARE VERSION
•
•
•
•

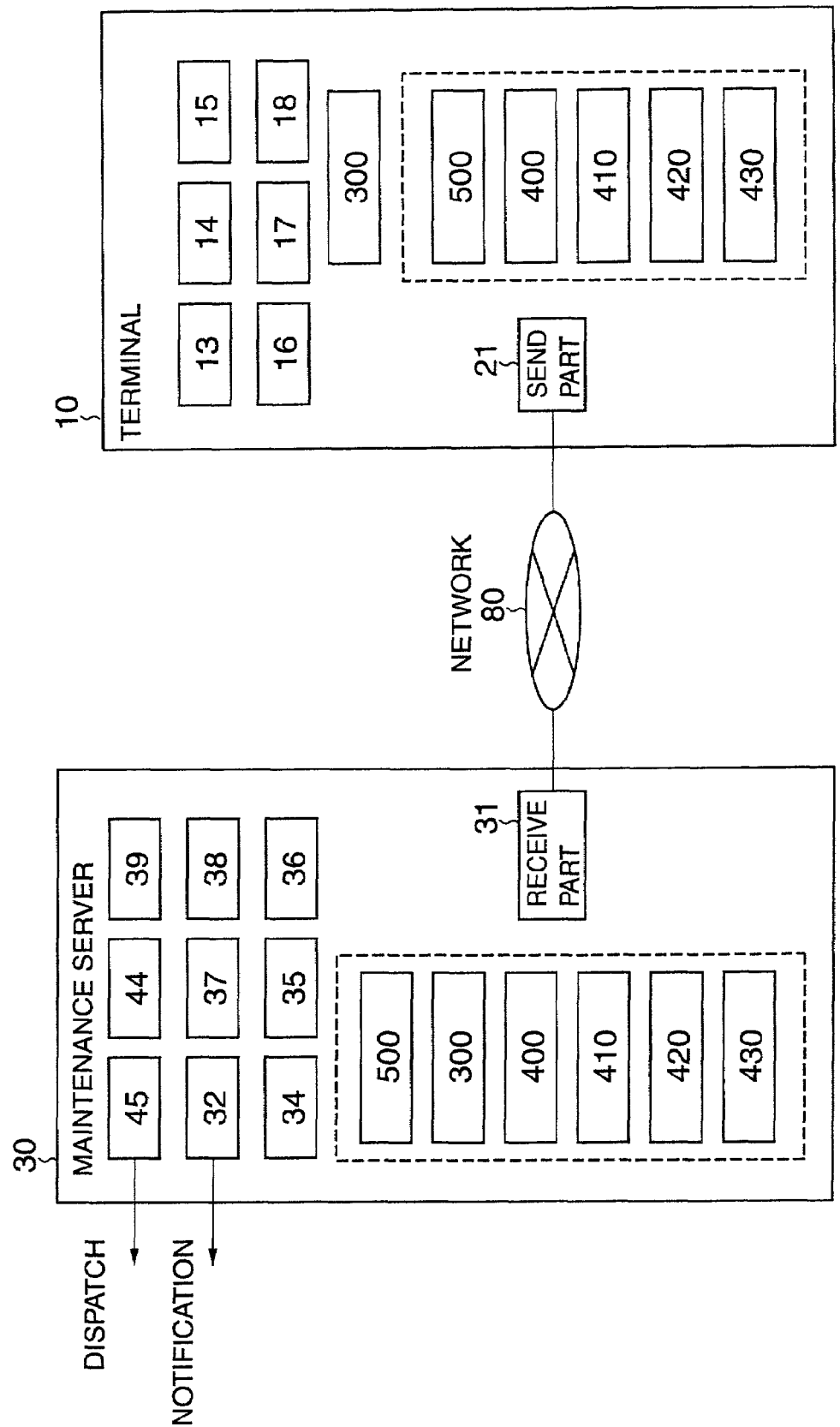

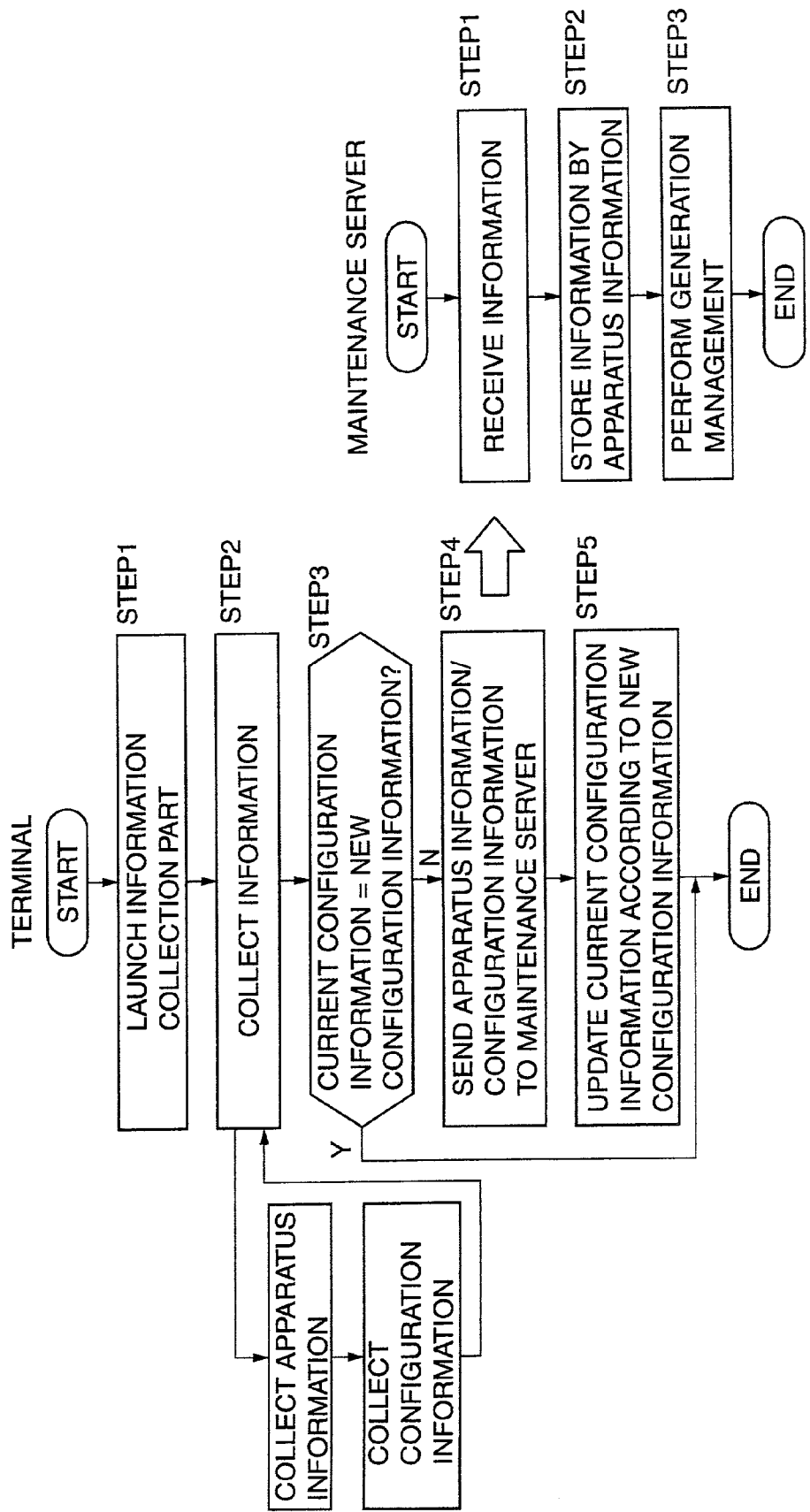

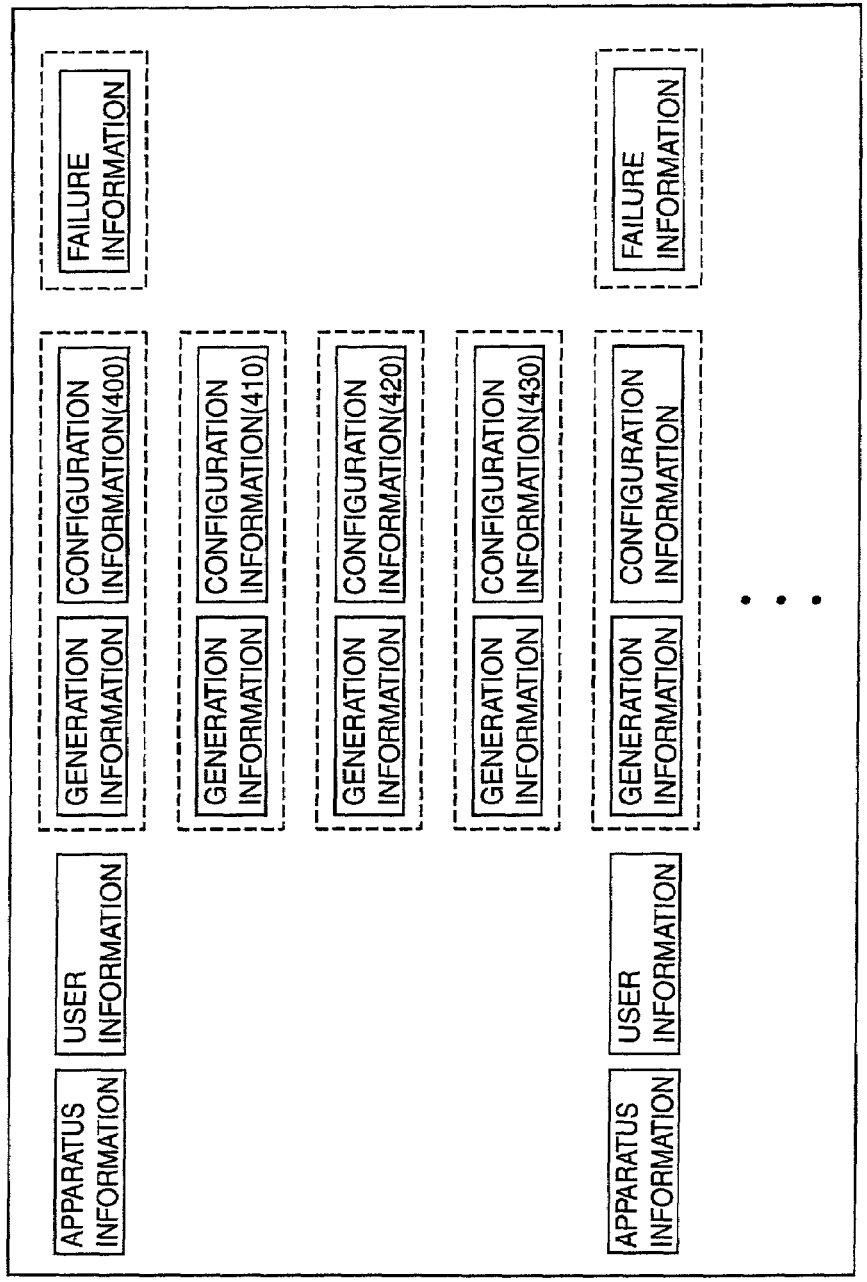

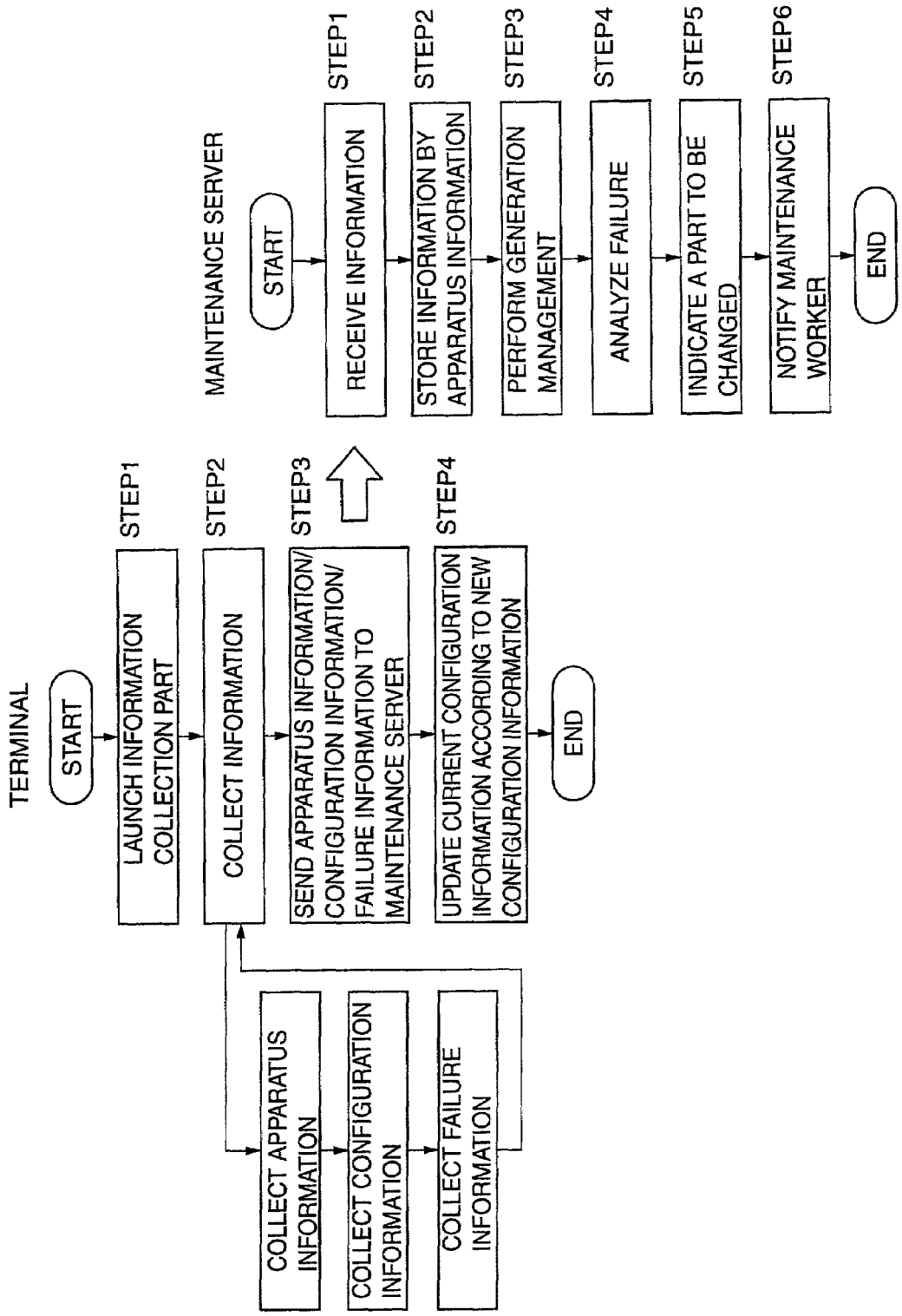

FIG.9

| DIFFERENCE CONFIGURATION INFORMATION |
|---|

FAILURE EVENT OCCURING
　　　　DATE AND TIME : XXXXXXXXX
EVENT OF ONE GENERATION
BEFORE OCCURING DATE AND TIME : XXXXXXXXX

| | | | |
|---|---|---|---|
| AAAAAAAAAAAA | a a a | xxx | ◄--- ① |
| BBBBBBBBBBBB | b b b | xxx | ◄--- ① |
| CCCCCCCCCCCC | c c c | xxx | ◄--- ① |
| DDDDDDDDDDDD | d d d | xxx | ◄--- ② |
| EEEEEEEEEEEE | e e e | xxx | ◄--- ① |
| FFFFFFFFFFFF | f f f | xxx | ◄--- ① |
| GGGGGGGGGGGG | g g g | xxx | ◄--- ① |
| HHHHHHHHHHHH | h h h | xxx | ◄--- ① |
| IIIIIIIIIIII | i i i | xxx | ◄--- ① |
| JJJJJJJJJJJJ | j j j | xxx | ◄--- ③ |
| KKKKKKKKKKKK | k k k | xxx | ◄--- ② |

FIG.12

| NAME OF MAINTENANCE WORKER | APPARATUS SERIES NAME | CONTENT OF FAILURE | DISPATCH TIME | MAINTENANCE WORK TIME |
|---|---|---|---|---|
| MMM | A | E10 | hh:ss:mm | hh:ss:mm |
|  | A | E20 | hh:ss:mm | hh:ss:mm |
|  | B | E10 | hh:ss:mm | hh:ss:mm |
| NNN | C | E10 | hh:ss:mm | hh:ss:mm |
| ⋮ | ⋮ | ⋮ | ⋮ | ⋮ |

FIG.14A

| APPARATUS ID | SERIES NAME | SOFTWARE NAME | SOFTWARE VERSION |
|---|---|---|---|
| .. | .. | .. | .. |

FIG.14B

| APPARATUS ID | SERIES NAME | CONFIGURATION INFORMATION ID | PATH TO CONFIGURATION INFORMATION |
|---|---|---|---|
| .. | .. | .. | .. |

| APPARATUS ID | SOFTWARE NAME | SOFTWARE VERSION | IMPLEMENTATION POSITION |
|---|---|---|---|
| .. | .. | .. | .. |

FIG.16

| PERIODIC CONNECTION SET SCHEDULE | |
|---|---|
| TIME ☐ ☐ | |
| PERIOD ONCE A WEEK ▼ | |
| DAY MONDAY ▼ | |
| OK | CANCEL |

REMOTE MAINTENANCE APPARATUS, TERMINAL CONNECTED TO THE APPARATUS AND COMPUTER READABLE MEDIUM FOR REALIZING THE APPARATUS AND THE TERMINAL

BACKGROUND OF THE INVENTION

1. Field of the Invention

The present invention-relates to a remote maintenance apparatus which maintains terminals connected to a network effectively and efficiently, the terminal which is connected to the remote maintenance apparatus, a program recording medium which stores a program for realizing the remote maintenance apparatus, and a program recording medium which stores a program for realizing the terminal.

2. Description of the Related Art

Terminals which are connected to a network are becoming widely used. Against this backdrop, a technique for maintaining the terminals which are connected to a network is needed.

When a user buys a terminal which can be connected to a network, the user installs necessary hardware and necessary software in the terminal such that the terminal performs necessary data processing.

Conventionally, configuration information of the terminal configured in this way is not informed to a vendor of the terminal. Thus, a maintenance worker of the vender obtains the configuration information from the user by a phone call and the like when a failure of the terminal occurs. Then, the worker makes preparation for repairing according to the configuration information and goes to the user so as to repair the terminal.

Thus, conventionally, the maintenance worker finds a cause for the failure from only the configuration information of the terminal at the time of occurring the failure.

In addition, conventionally, when a user decides to install a new software program due to version up of the program, the user browses a list of software programs which is provided by a vendor so that the user selects a software program to be downloaded and installs the software program.

When a maintenance worker decides to install a new software program for recovering from failure of the terminal, the maintenance worker browses a list of software programs which is provided by a vendor so that the maintenance worker selects a software program to be downloaded and installs the software program.

At this time, conventionally, the newly downloaded program is set in an executable state immediately. In addition, conventionally, a workload for maintenance is obtained from work reports of maintenance workers. Then, skill of each maintenance worker or level of each service company is evaluated based on the workload.

However, when the method is adopted in which the maintenance worker makes an inquiry to the user about the configuration information of the failure terminal, there is a problem in that correct configuration information can not be obtained. In addition, there is a problem in that it takes time to obtain the configuration information.

Further, as the conventional technique, when the method is adopted in which a cause of the failure of the terminal is searched only by the configuration information at the time of failure, there is a problem in that the maintenance worker is perplexed with the search of the failure. That is, failures of hardware or software of a terminal is often caused by combination of software programs or combination of software programs and hardware. However, since generation management of the configuration information of the terminal is not performed, a cause of the failure of the terminal is searched only by the configuration information at the time of failure. Thus, the maintenance worker is perplexed with the search of the failure.

Further, since the user or the maintenance worker downloads a software program manually, there is a problem in that a necessary software program for each terminal is not downloaded speedily. That is, when a software program needs to be downloaded for a terminal, the same software program needs to be downloaded for other terminals of the same configuration. However, according to the conventional technique, the software program is not downloaded in other terminals unless each user of the other terminals or the maintenance worker download the software program.

Further, as the conventional technique, when the method is adopted in which the newly downloaded program is set in an executable state immediately, there is a problem in that needs of a user who desires that the newly downloaded program is set in the executable state from a time when the user wants are not satisfied.

In addition, as the conventional technique, when the method is adopted in which skill of each maintenance worker or level of each service company is evaluated based on the workload which is obtained from work reports of maintenance workers, there is a problem in that the evaluation can not be objectively performed and the evaluation becomes burdensome.

SUMMARY OF THE INVENTION

It is an object of the present invention to provide a new remote maintenance apparatus for maintaining terminals connected to a network efficiently and effectively, a new terminal connected to the remote maintenance apparatus, a program recording medium which stores a program for realizing the remote maintenance apparatus, and a program recording medium which stores a program for realizing the terminal.

The above object of the present invention is achieved by a remote maintenance apparatus used for maintenance of terminals connected to a network, including:

a first obtaining part which obtains configuration information of terminals sent from the terminals;

a storing part which stores the configuration information obtained by the first obtaining part while bringing the configuration information into correspondence with generation information;

a second obtaining part which obtains configuration information of a failed terminal which is associated with failure information which is sent from the failed terminal, or, which obtains configuration information of the failed terminal by identifying the newest configuration information of the failed terminal which is stored in the storing part; and an extraction part which extracts difference information between configuration information obtained by the second obtaining part and configuration information stored in the storing part.

According to the above-mentioned remote maintenance apparatus of the present invention, search for a cause of failure can be performed speedily, since generation management is performed for configuration information of the terminals. That is, when a failure occurs in a terminal, the remote maintenance server extracts and outputs difference information between configuration information of the terminal at the time of the failure and configuration information having older generation which is stored in the storing part.

BRIEF DESCRIPTION OF THE DRAWINGS

Other objects, features and advantages of the present invention will become more apparent from the following detailed description when read in conjunction with the accompanying drawings, in which:

FIG. 3 shows a user information input screen;
FIG. 4A shows apparatus information;
FIG. 4B shows configuration information;
FIG. 5 shows an embodiment of the present invention;
FIG. 6 shows a process of the present invention;
FIG. 7 is a figure for explaining generation management of configuration information;
FIG. 8 shows a process of the present invention;
FIG. 9 shows a screen of difference configuration information;
FIG. 12 shows evaluation information of maintenance work;
FIGS. 14A and 14B show management information;
FIG. 16 shows a screen for setting periodical connection.

DETAILED DESCRIPTION OF THE PREFERRED EMBODIMENTS

Figure 1:
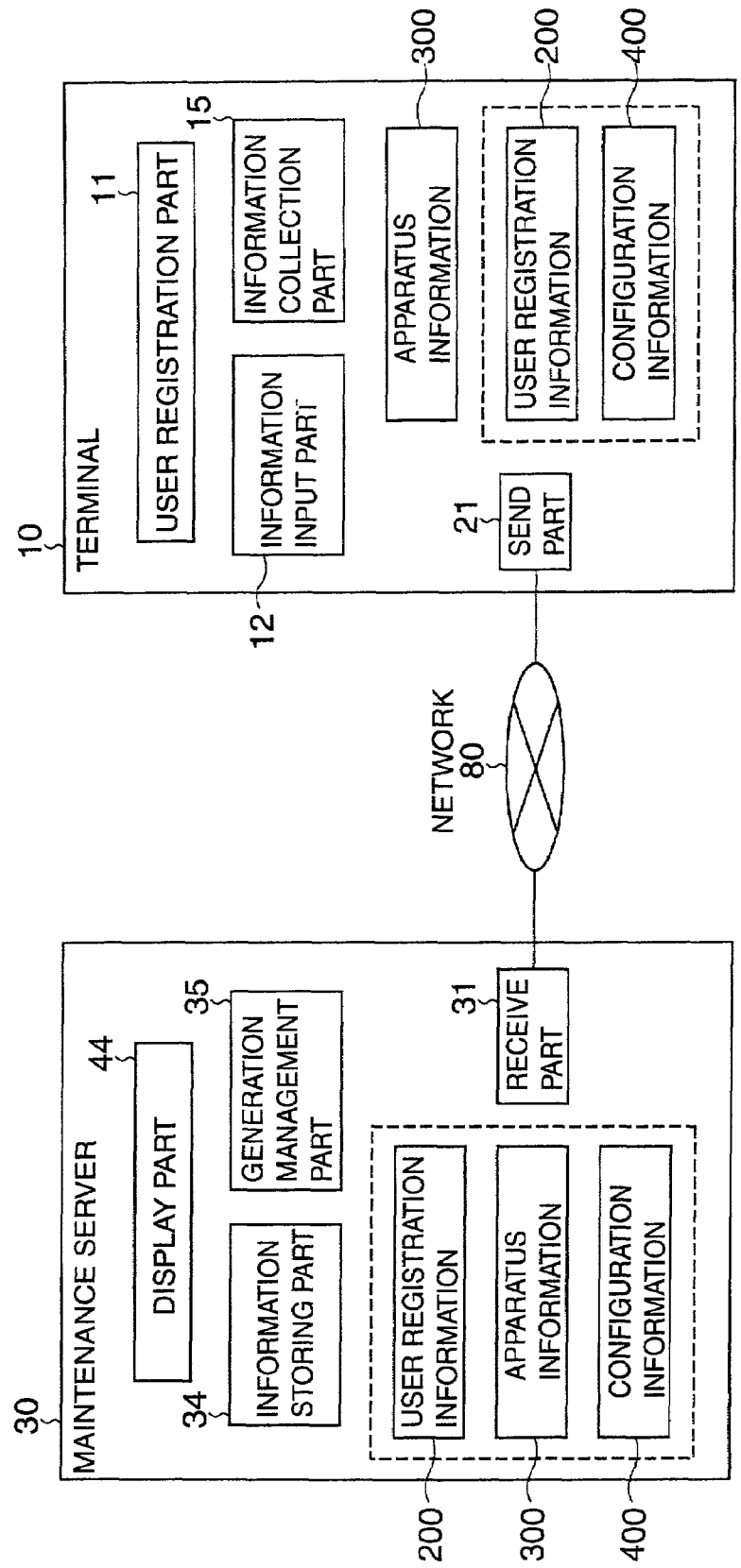
FIG. 1 shows an embodiment of the present invention.

In the following, the principle of the present invention will be described.

The remote maintenance apparatus (which will be called a maintenance server in embodiments) includes: a first obtaining part which obtains configuration information of terminals sent from the terminals; a storing part which stores the configuration information obtained by the first obtaining part while bringing the configuration information into correspondence with generation information; a second obtaining part which obtains configuration information of a failed terminal which is associated with failure information which is sent from the failed terminal, or, which obtains configuration information of the failed terminal by identifying the newest configuration information of the failed terminal which is stored in the storing part; and an extraction part which extracts difference information between configuration information obtained by the second obtaining part and configuration information stored in the storing part.

In this configuration, the remote maintenance apparatus may have an issuing part which issues, to a terminal, an instruction for the terminal to send configuration information when a configuration information ID sent from the terminal is not the same as the newest configuration information ID which is stored in the storing part.

In addition, the remote maintenance apparatus may include a collection part which collects start date and time information, and, end date and time information of maintenance work performed in terminals, and a generation part which generates evaluation information of maintenance work from the date and time information collected by the collection part.

In the above-mentioned remote maintenance server, the first obtaining part obtains configuration information associated with user information sent from the terminal, and obtains changed configuration information when a configuration of the terminal is changed, and stores the configuration information in the storing part. In addition, the obtaining part obtains configuration information sent in response to the instruction issued by the issuing part and stores the configuration information in the storing part.

According to the process of the first obtaining part, the storing part stores the configuration information of each terminal while bringing it into correspondence with generation information.

In response to this, the second obtaining part obtains configuration information of a failed terminal which is associated with failure information which is sent from the failed terminal, or, obtains configuration information of the failed terminal by identifying the newest configuration information of the failed terminal which is stored in the storing part. Then, the extraction part extracts difference information between configuration information obtained by the second obtaining part and configuration information stored in the storing part which has older generation.

In addition, the remote maintenance apparatus may configured in the following way.

The remote maintenance apparatus includes: an obtaining part which obtains configuration information of terminals sent from the terminals; a storing part which stores the newest configuration information of each terminal obtained by the obtaining part; a generation part which identifies terminals to which resources are distributed on the basis of the resources and configuration information stored in the storing part, and generates a list describing correspondence between the resources and the terminals to which the resources are distributed; and a distribution part which distributes the resources described in the list to the terminals described in the list.

In this configuration, the storing part stores newest configuration information according to the processes of the obtaining part. Then, the generation part identifies terminals to which resources are distributed on the basis of the resources and configuration information stored in the storing part, and generates a list describing correspondence between the resources and the terminals to which the resources are distributed.

Then, the distribution part sends a part pertinent to a terminal in the list to the terminal. When the terminal sends a distribution request of resources in response to this, the distribution part distributes the resources. In addition, when resources are requested by a terminal, the distribution part identifies the resources which should be sent to the terminal by searching the list and distributes the resources.

Accordingly, when new resources to be distributed are generated, the remote maintenance server identifies terminals to which the resources are distributed according to configuration information of the terminals, then, distributes the resources to the terminal. Thus, the resources which should be distributed to each terminal can be distributed speedily.

A terminal which is connected to the remote maintenance apparatus via a network includes: an input part which inputs user information; a collection part which collects apparatus information of the terminal and configuration information of the terminal when the input part inputs the user information; and a send part which sends the apparatus information and the configuration information, and the user information to the remote maintenance apparatus while maintaining correspondences of the apparatus information, the configuration information and the user information.

In this configuration, the terminal may include a detection part which detects start and end of maintenance work or detects start date and time information and end date and time information of maintenance work; and a notification part which notifies the remote maintenance apparatus of information detected by the detection part.

In this configuration, the collection part collects changed configuration information when a configuration of the terminal is changed, and the send part sends said changed configuration information to the remote maintenance apparatus while bringing the configuration information into correspondence with the apparatus information. In addition, the collection part collects configuration information when a configuration information ID stored in the terminal is not the same as a configuration information ID stored in the remote maintenance apparatus, and the send part sends the configuration information collected at this time to the remote maintenance apparatus while bringing the configuration information into correspondence with the apparatus information.

Accordingly, when the user information is registered in the remote maintenance apparatus, the terminal collects configuration information and sends it to the remote maintenance apparatus. After that, the terminal collects configuration information and sends it to the remote maintenance apparatus every time when the configuration is changed. Thus, the remote maintenance apparatus can manage the newest configuration information of the terminal and can perform generation management of the configuration information of the terminal. Therefore, a maintenance worker can obtain configuration information at the time of failure and before the failure accurately and easily.

The terminal can be also configured in the following way.

The terminal may include: an obtaining part which obtains resources distributed from the remote maintenance apparatus; a setting part which sets the resources in an application waiting state or in an immediate execution state; a control part which executes the resources when conditions for releasing the application waiting state is satisfied or when the resources are set in the immediate execution state.

In this configuration, the terminal may includes: an obtaining part which obtains information on the resources from the remote maintenance apparatus; a judging part which judges whether resources in the application waiting state is unnecessary or not according to the information obtained by the obtaining part; and a release part which releases the application waiting state of the resources when the judging part judges that the resources are unnecessary.

In this configuration, the setting part sets the resources in an application waiting state or in an immediate execution state. When the obtaining part obtains the resources from the remote maintenance apparatus, the control part sets the resources in the application waiting state if the setting part sets the resources in the application waiting state, and, executes the resources when conditions for releasing the application waiting state is satisfied or when the resources are set in the immediate execution state by the setting part.

Then, the release part releases the application waiting state of the resources when the judging part judges that the resources are unnecessary according to the information on distribution resources obtained by the obtaining part.

Accordingly, the terminal sets the resources in an application waiting state or in an immediate execution state. According to the setting, the terminal sets the resources in the application waiting state and executes the resources when conditions for releasing the application waiting state is satisfied or when the resources are in immediate execution state. Therefore, a request of a user who wants to execute the newly distributed resources from a time can be met.

In the following, the present invention will be described in detail according to following embodiments.

FIG. 1 shows an embodiment of the present invention relating to user registration. As shown in this figure, a system of the present invention includes at least one terminal 10 which is connected to a network 80 and at least one maintenance server 30.

As shown in this figure, the terminal 10 includes a user registration part 11, an information input part 12, an information collection part 15, a send part 21 and apparatus information 300. The maintenance server 30 includes a receive part 31, an information storing part 34, a generation management part 35 and a display part 44. Specifically speaking, functions of the terminal 10 and functions of the maintenance server 30 are realized by programs. The programs can be stored in a computer readable recording medium such as a semiconductor memory.

Figure 2:
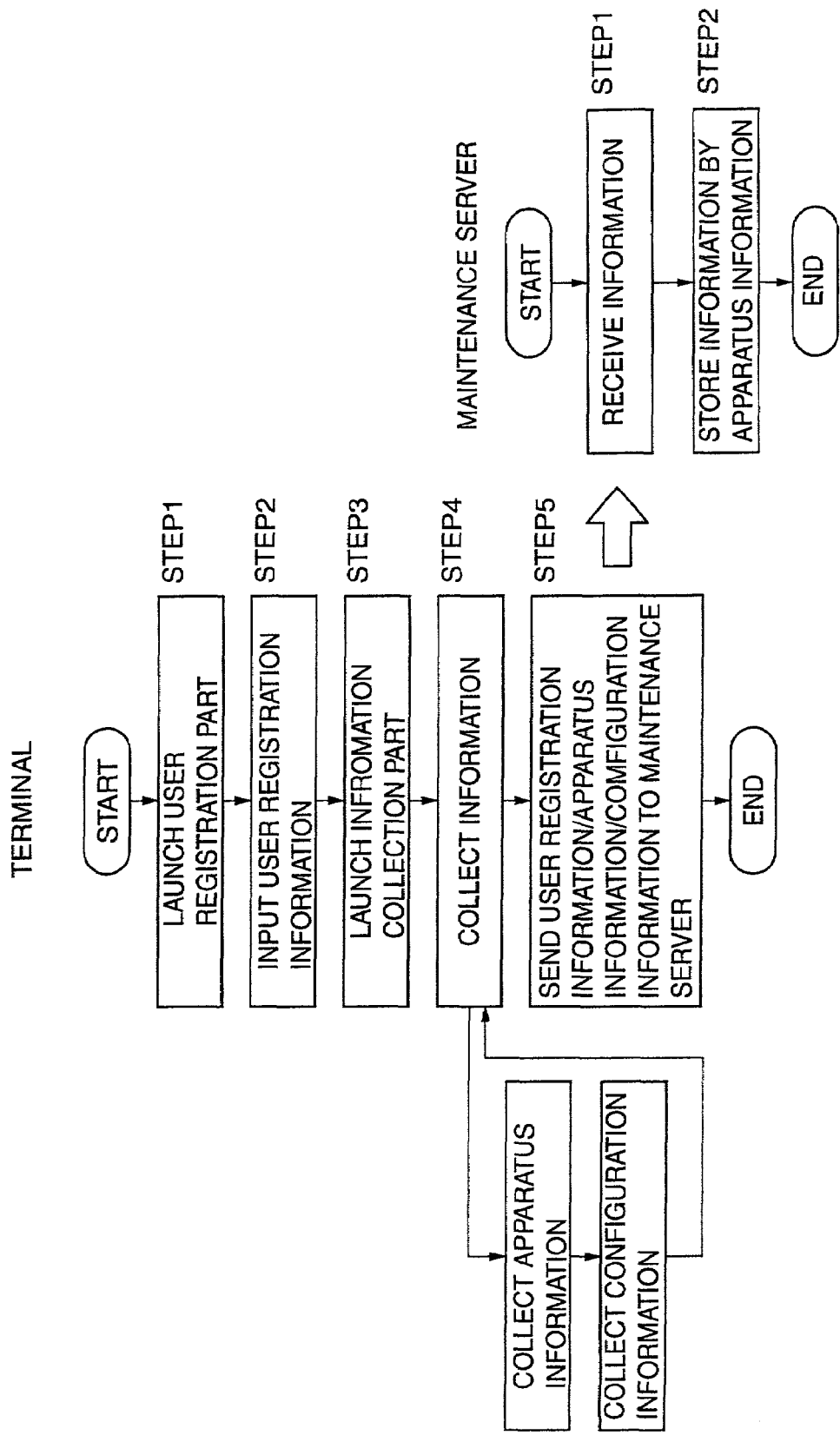
FIG. 2 shows a process of the present invention.

According to a process flowchart shown in FIG. 2, a user registration process performed in this system of the present invention will be described.

When a user buys the terminal 10, the user launches the user registration part 11 of the terminal 10 in response to a registration request of user information. Then, the terminal 10 displays an input screen for user information shown in FIG. 3. After that, the terminal 10 obtains the user registration information 200 necessary for user registration by receiving input data for the input screen by using the information input part 12.

Next, in synchronization with this process, the information collection part 15 is launched so that the information collection part 15 collects the apparatus information 300 for identifying the terminal 10 which is burn into ROM and the like, and the configuration information 400 of hardware and software which are implemented in the terminal 10.

The apparatus information is configured by an apparatus ID and an apparatus series name and the like for example as shown in FIG. 4A. The configuration information 400 includes information on hardware and software implemented in the terminal 10 as shown in FIG. 4B for example. That is, these apparatus information and configuration information are collected.

Next, the terminal 10 sends the user registration information 200 which is received, and the apparatus information 300 and the configuration information 400 which are collected to the maintenance server 30 via the network 80 by using the send part 21 while keeping correspondence between them.

In response to the process of the terminal 10, the maintenance server 30 receives the user registration information 200, the apparatus information 300 and the configuration information 400 which are sent from the terminal 10 by using the receive part 31. Then, the maintenance server 30 stores the user registration information 200 and the configuration information 400 by using the apparatus information 300 as a key by using the information storing part 34 while allocating generation information by using the generation management part 35.

In this way, according to the present invention, the maintenance server 30 obtains the configuration information 400 of the terminal 10 at the time when the user gets the terminal 10 by collecting the configuration information 400 in synchronization with registration of user information.

Accordingly, when the user wants to connect an add-on RAID hard disk drive (HDD) after registration of user information and the user makes an inquiry about the add-on of the HDD to a support center, an operator of the support center can recommend available hard disk drives speedily and appropriately by displaying the configuration information 400 of the terminal 10 of the user by using the display part 44 of the maintenance server 30.

FIG. 5 shows an embodiment on maintenance according to the present invention. In the figure, the same reference numerals are used to identify features corresponding to those in FIG. 1.

As shown in this figure, the terminal 10 includes a schedule part 13, an abnormal event monitoring part 14, an information collection part 15, a configuration change checking part 16, a maintenance start notification part 17, maintenance end notification part 18, the send part 21 and the apparatus information 300.

The maintenance server 30, as shown in this figure, includes a receive part 31, a result notification part 32, an information storing part 34, the generation management part 35, a configuration change checking part 36, a failure analyzing part 37, a change part indicating part 38, a maintenance time compilation part 39, a display part 44, a maintenance worker notification part 45, the apparatus information 300 and the configuration information 400 which are registered by the configuration as shown in FIG. 1.

Specifically speaking, functions of the terminal 10 and functions of the maintenance server 30 are realized by programs. The programs can be stored in a computer readable recording medium such as a semiconductor memory.

First, processes of the present invention will be described according to a flowchart shown in FIG. 6.

There is a case in which the configuration of the terminal 10 is changed, for example, due to installing an additional hard disk drive in the terminal 10 according to the embodiment shown in FIG. 1. Taking it into account, the terminal 10 launches the information collection part 15 according to the schedule part 13 after a lapse of a time since the system is launched (or immediately, or periodically). Thus, the terminal 10 collects the apparatus information 300 for identifying the terminal 10 and configuration information of hardware and software at the time (the configuration information 410, for example).

Next, the configuration change checking part 16 is launched and the terminal 10 determines whether the configuration information is changed. When the terminal 10 determines that the configuration information is changed, new configuration information (for example, configuration information 410) is set as current configuration information. Then, the terminal 10 launches the send part 21 to send the collected apparatus information 300 and the new configuration information to the maintenance server 30 via the network 80 while bringing the collected apparatus information 300 into correspondence with the new configuration information.

In response to the process of the terminal 10, the maintenance server 30 receives the apparatus information 300 and the configuration information (the configuration information 410 for example) which are sent from the terminal 10 by using the receive part 31. Then, the maintenance server 30 stores the apparatus information 300 and the configuration information 400 (the configuration information 410 for example) by using the apparatus information 300 as a key with the information storing part 34 while allocating generation information by using the generation management part 35.

If this process is performed every time when the system is launched, new configuration information at the time of configuration change can be sent to the maintenance server 30 even when the configuration is changed after powering off the terminal 10. In addition, when the configuration is changed without powering off, if the change of the configuration can be detected, new configuration information can be sent to the maintenance server 30 at the time of configuration change by performing the above-mentioned process when the configuration is changed.

However, in reality, there is a case in which a maintenance worker launches the system multiple times when additional hardware is installed or software is revised. For example, after the maintenance worker installs additional hardware into an erroneous portion and launches the system, the maintenance worker finds the error and changes the portion for installing the hardware, and, then, the maintenance worker launches the system. In addition, when a plurality of additional hardware components are installed, the system is launched multiple times. Thus, it is desirable that the process of collecting the configuration information and sending it to the maintenance server 30 is performed after a lapse of a time.

Accordingly, new configuration information 410 is obtained according to the embodiment shown in FIG. 1, for example, when an additional hard disk drive of the terminal 10 is installed. Then, it is detected, by the configuration change checking part 16, that the hard disk drive is installed by comparing the new configuration information with the configuration information 400 which is obtained before the hard disk drive is installed. Accordingly, the apparatus information 300 and the new configuration information 410 is sent to the maintenance server 30.

In addition, when new configuration information is obtained due to adding software, deleting software, changing versions or the like, the apparatus information 300 and the new configuration information 410 are sent to the maintenance server 30.

Then, the maintenance server 30 manages, by generation, the configuration information sent from the terminal 10 by using the apparatus information 300 as a key as shown in FIG. 7.

In the following, a process performed when a trouble occurs in the terminal will be described with reference to a process flowchart shown in FIG. 8.

When failure, such as failure of the HDD, occurs in the terminal 10, the abnormal event monitoring part 14 detects the failure so that the terminal 10 launches the information collection part 15. Then, the information collection part 15 collects the apparatus information 300 for identifying the terminal 10, configuration information (for example, configuration information 420) of hardware and software at the time when the failure occurred, and failure information 500.

Next, the terminal sends the apparatus information 300, the configuration information at the time of the failure (for example, the configuration information 420) and the failure information 500 to the maintenance server 30 via the network 80 by using the send part 21 while maintaining correspondence between them.

In response to this process of the terminal 10, the maintenance server 30 receives the apparatus information 300, the configuration information (for example, the configuration information 420) and the failure information 500 from the terminal 10 by using the receive part 31. Then, the information storing part 34 in the maintenance server stores the apparatus information 300, the configuration information (for example, the configuration information 420) and the failure information 500 by using the apparatus information as a key while allocating generation information by using the generation management part 35.

Next, the maintenance server 30 analyzes the received failure information so as to analyze a cause of the failure (DEAD) of the HDD for example by using the failure analyzing part 37. In addition, the maintenance server 30 analyzes the configuration information at the time of the failure (for example, configuration information 420) by using the a change part indicating part 38 so that a part at which the HDD to be changed should be installed is indicated. Then, the maintenance server launches the maintenance worker notification part 45 so as to notify a maintenance worker of the indicated part.

Accordingly, the maintenance server 30 obtains the configuration information of the terminal 30 at the time of occurrence of the failure according to which information the maintenance server 30 performs a failure analyzing process.

As described above as shown in FIG. 8, the terminal 10 collects the configuration information at the time of occurrence of the failure and sends it to the maintenance server 10. However, as is understood from description mentioned before, since the maintenance sever 30 continuously keeps track of newest configuration information of the terminal 10, the process of sending the configuration information at the time of occurrence of the failure can be omitted.

The failure analyzing part 37 performs centralized management of failure information sent from the terminal 10. When a search request of failure information is issued by an operator who operates the maintenance server 30 by specifying an apparatus ID, failure occurrence date and time or the like, the failure analyzing part 37 searches failure information for information which satisfies the request. Then, a list of the searched information is displayed. When specific failure information is selected from the list, detailed information (dump data and the like) on the failure information is displayed.

In addition, the failure analyzing part 37 extracts difference information between configuration information at the time of occurrence of the failure and newest configuration information (configuration information one generation before) which has been collected before the occurrence of the failure. The failure analyzing part 37 shows the difference information to the operator so as to aid the operator to analyze the failure. In addition, it is possible, according to instruction of the operator, that difference information between configuration information at the time of occurrence of the failure and configuration information collected earlier than the configuration information one generation before.

That is, as shown in FIG. 9, configuration information which is common to both of configuration information at the time of occurrence of the failure and configuration information before the failure is displayed with green for example as shown by ① in the figure. Configuration information which is described only in the configuration information before occurrence of the failure is displayed with blue for example as shown by ② in the figure. Configuration information which is described only in the configuration information at the time of occurrence of the failure is displayed with red for example as shown by ③ in the figure. Accordingly, the above-mentioned difference information can be displayed to the operator.

A combination of software programs or a combination of hardware and software programs often becomes a cause of a failure of hardware or software of the terminal 10. Thus, by displaying the difference information, a maintenance worker can find a cause of a failure easily.

Receiving a dispatch instruction from the maintenance server 30, the maintenance worker goes to the terminal 10 where the failure occurs to repair it. At this time, the terminal 10 displays a control menu shown in FIG. 10. The maintenance worker starts to perform maintenance work by clicking "maintenance work start button" (not shown in FIG. 10) provided in the control menu.

By clicking the maintenance work start button, the maintenance start notification part 17 obtains date and time information (time information) of the start of the maintenance work. Then, the send part 21 sends the date and time information (time information) of the start of the maintenance work to the maintenance server 30. In this process, the send part 21 may sends only information which indicates that the maintenance work starts since date and time information can be obtained by the maintenance server 30. The above process can be applied to date and time information of the end of the maintenance work.

Then, the maintenance worker performs maintenance work such as changing a hard disk drive. When the maintenance work is finished, the maintenance worker clicks "maintenance work end button" which is provided in the control menu shown in FIG. 10.

By clicking the maintenance work end button, the maintenance end notification part 18 obtains date and time information (time information) of the end of the maintenance work. In addition, when the maintenance work finished, the schedule part 13 launches the information collection part 15.

Figure 11:
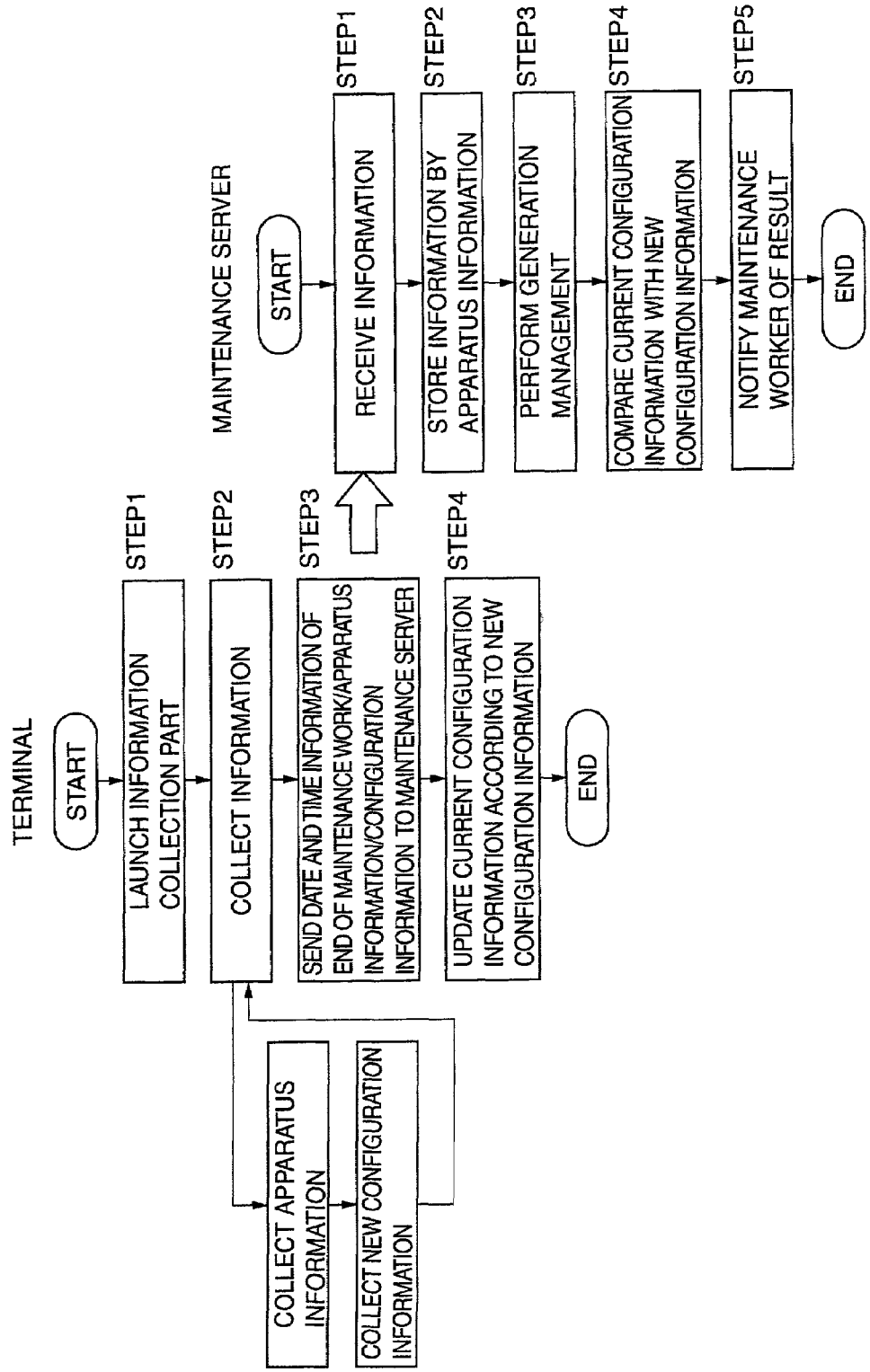
FIG. 11 shows a process of the present invention.

FIG. 11 shows a flowchart of a process which is performed subsequent to the above-mentioned process.

When the maintenance worker finished the maintenance work, the terminal 10 launches the information collection part 15 so as to collect the apparatus information 300 for identifying the terminal 10 and configuration information (configuration information 430 for example) of software programs and hardware after the end of the maintenance work.

Next, the terminal sends the date and time information on the end of the maintenance work which is obtained by the maintenance end notification part 18 and the apparatus information 300/configuration information (configuration information 430 for example) which are collected by the information collection part 15 to the maintenance server 30 via the network 80.

After that, the maintenance server 30 receives the apparatus information 300/the configuration information (configuration information 430 for example) which are sent from the terminal 10 by using the receive part 31. Then, the maintenance server 30, by using the information storing part 34, stores the apparatus information 300/the configuration information (configuration information 430 for example) by using the apparatus information as a key while allocating generation information by using the generation management part 35.

Next, the maintenance server 30 compares configuration information (the configuration information 420 for example) at the time of occurrence of the failure and the configuration information (the configuration information 430 for example) at the time when the maintenance work ends by using the configuration change checking part 16 so that the maintenance server obtains difference information. Then, the maintenance server 30 checks the difference information against the failure information 500 which indicates causes of the failure so that the maintenance server 30 checks, for example, whether the hard disk drive is properly changed. After that, the maintenance server 30 notifies the maintenance worker of the result of the checking by using the result notification part 32.

In addition, when the maintenance server 30 receives the date and time information of the start of the maintenance work which is sent from the maintenance start notification part 17 of the terminal 10 and the date and time information of the end of the maintenance work which is sent from the maintenance end notification part 18 of the terminal 10, the maintenance server 30 compiles dispatching time and maintenance work time shown in FIG. 12 for each maintenance worker, each apparatus series and each failure by using the maintenance time compilation part 39 so that the maintenance server 30 generates evaluation information necessary for evaluating problems or efficiency of the maintenance work. In this process, the dispatching time is defined as time from occurrence of a failure until the start of the maintenance work, and the maintenance work time is defined as time from the start of the maintenance work until the end of the maintenance work.

At this time, when a plurality of service companies are used, skill of each company can be evaluated by compiling the dispatching time and the maintenance work time for each company. As mentioned above, according to the present invention, efficient maintenance work against occurrence of failures can be realized.

Figure 10:
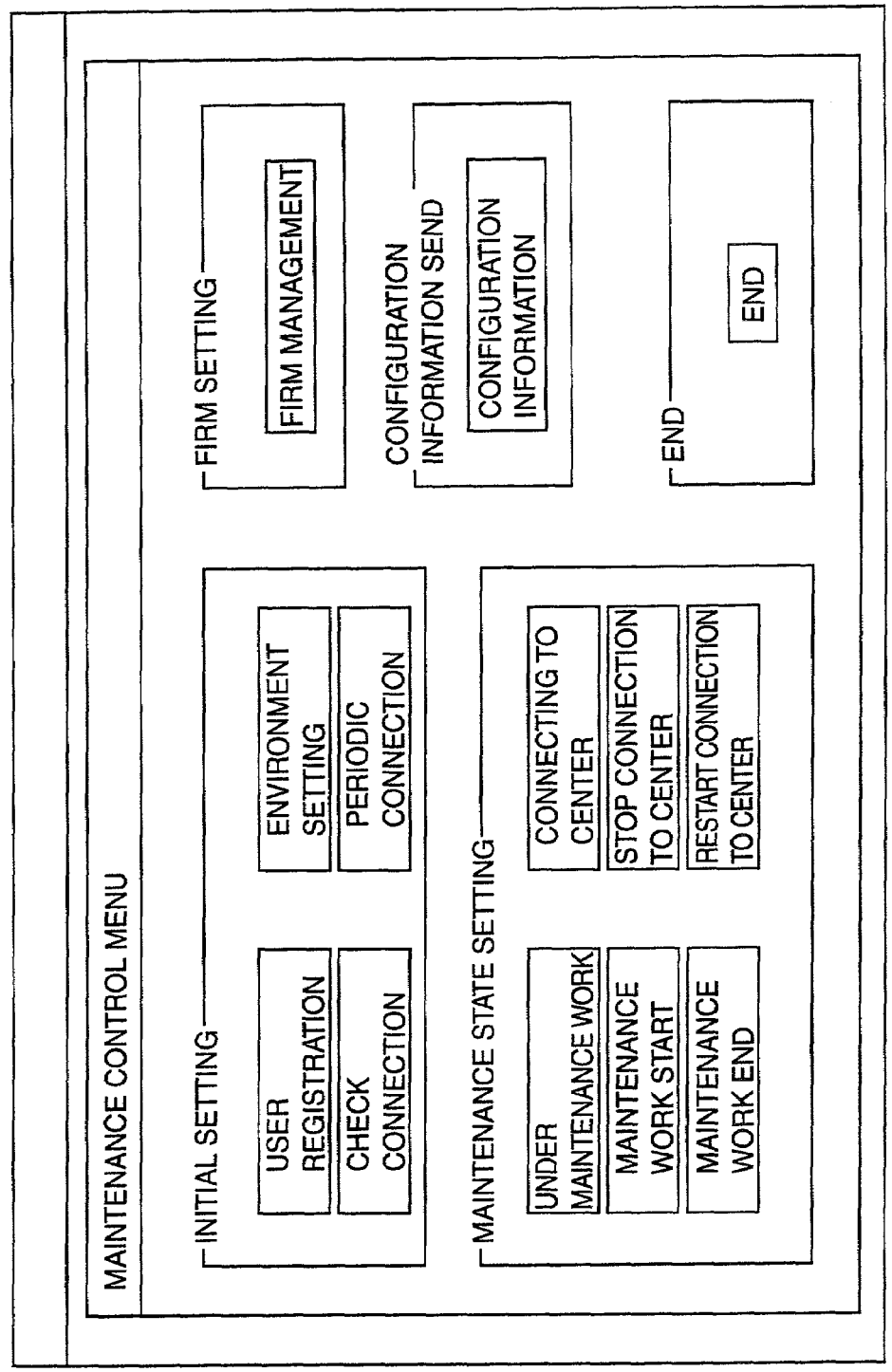
FIG. 10 shows a screen of an operation menu.
Figure 13:
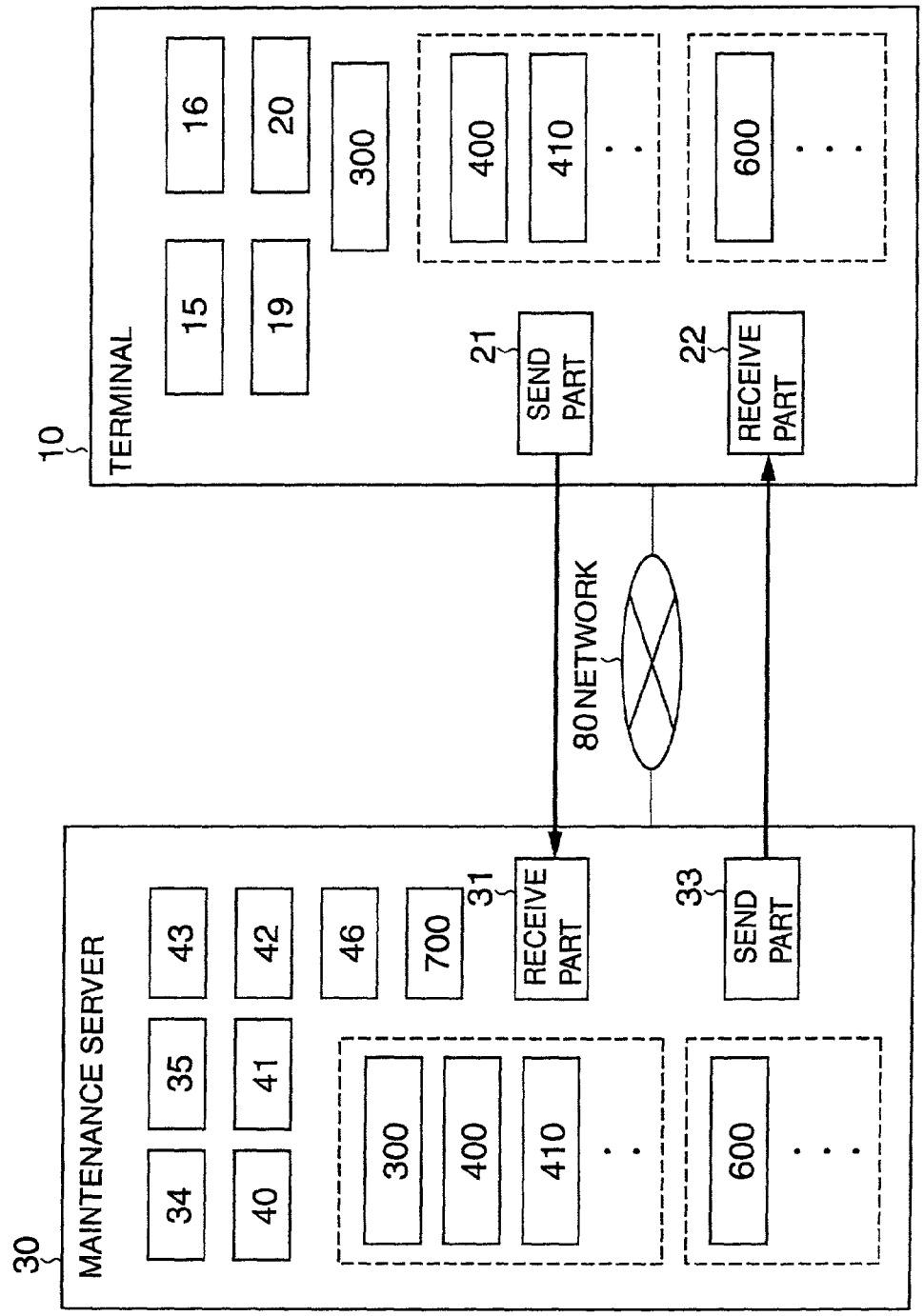
FIG. 13 shows an embodiment of the present invention.

FIG. 13 shows an embodiment in which software revising work is performed. In FIG. 10, the same reference numerals are used to identify features corresponding to those in FIG. 1 and FIG. 5.

The terminal 10 includes an information collection part 15, a configuration change checking part 16, a periodic connection part 19, a software application part 20, a send part 21, a receive part 22, apparatus information 300, and software programs 600 which are distributed from the maintenance server 30.

The maintenance server 30 includes a receive part 31, a send part 33, an information storing part 34, a generation management part 35, an object list generation part 40, an object list checking part 41, a distribution monitoring part 43, a registration part 46 and software programs to be distributed to the terminal 10.

Specifically speaking, functions of the terminal 10 and functions of the maintenance server 30 are realized by programs. The programs can be stored in a computer readable recording medium such as a semiconductor memory.

For example, when a cause of a failure exists in firmware of the hard disk drive, the firmware is revised for removing the cause of the failure. At this time, firmware should be revised for all terminals which use the same hard disk drive since the same failure may occur in terminals which use the same hard disk drive.

For this purpose, the maintenance server 30 shown in FIG. 13, by using the registration part 46, launches the object list generation part 40 when the maintenance server 30 registers a new software program (including firmware, microprograms, and including those in which version number is revised) so that a correspondence between the new software program and terminals 10 to which the new software program is downloaded is added to the object list 700 for managing destinations for downloading software.

As shown in FIG. 14A, the object list 700 is configured such that the terminals 10 to which software programs are distributed are managed by managing series names of the terminals 10, software program names to be distributed to the terminals 10 and versions of the software programs.

As mentioned above, the maintenance server 30 is configured so as to perform generation management of configuration information of each terminal 10. In the configuration information in which the generation is managed, configuration information IDs (which are notified by the terminals 10) are managed for the newest configuration information. However, configuration information other than the newest configuration information also can be managed by using the configuration information ID.

That is, the maintenance server 30 is configured to manage, for every terminal 10, series names of the terminals 10, IDs of the newest configuration information and the configuration information (software programs/software program versions/implementation positions) by using apparatus information as a key as shown in FIG. 14B.

Accordingly, when a new software program (which has attribute information which includes series name of the terminal to which the new software program is applied, software program name, and software version) is registered from design departments and the like, the object list generation part 40 searches a file shown in FIG. 14B for a terminals 10 which have the series name to which the registered software program is applied. Then, the object list generation part 40 searches the searched terminals 10 in the file shown in FIG. 14B for terminals 10 having the newly registered software program. In addition, the object list generation part 40 searches the searched terminals 10 in the file shown in FIG. 14B for terminals 10 which have older version software than the version of the newly registered software. Then, relationship between the searched terminals 10 and the series name/software program name/software version of the newly registered software program is added to the object list 700 shown in FIG. 14A.

When a notification of software change (notification of change of configuration information) is sent from a terminal 10, if a software program (having the same software program name/series name) managed by the maintenance server 30 is newer that the notified software program, the object list generation part 40 adds relationship between ID of the terminal 10 which sent the notification and the series name/software program name/software version of the new software to the object list 700 in order to download the new software program to the terminal 10.

When the object list generation part 40 downloaded the software program according to the object list 700, the object list generation part 40 deletes the corresponding record from the object list 700.

Figure 15:
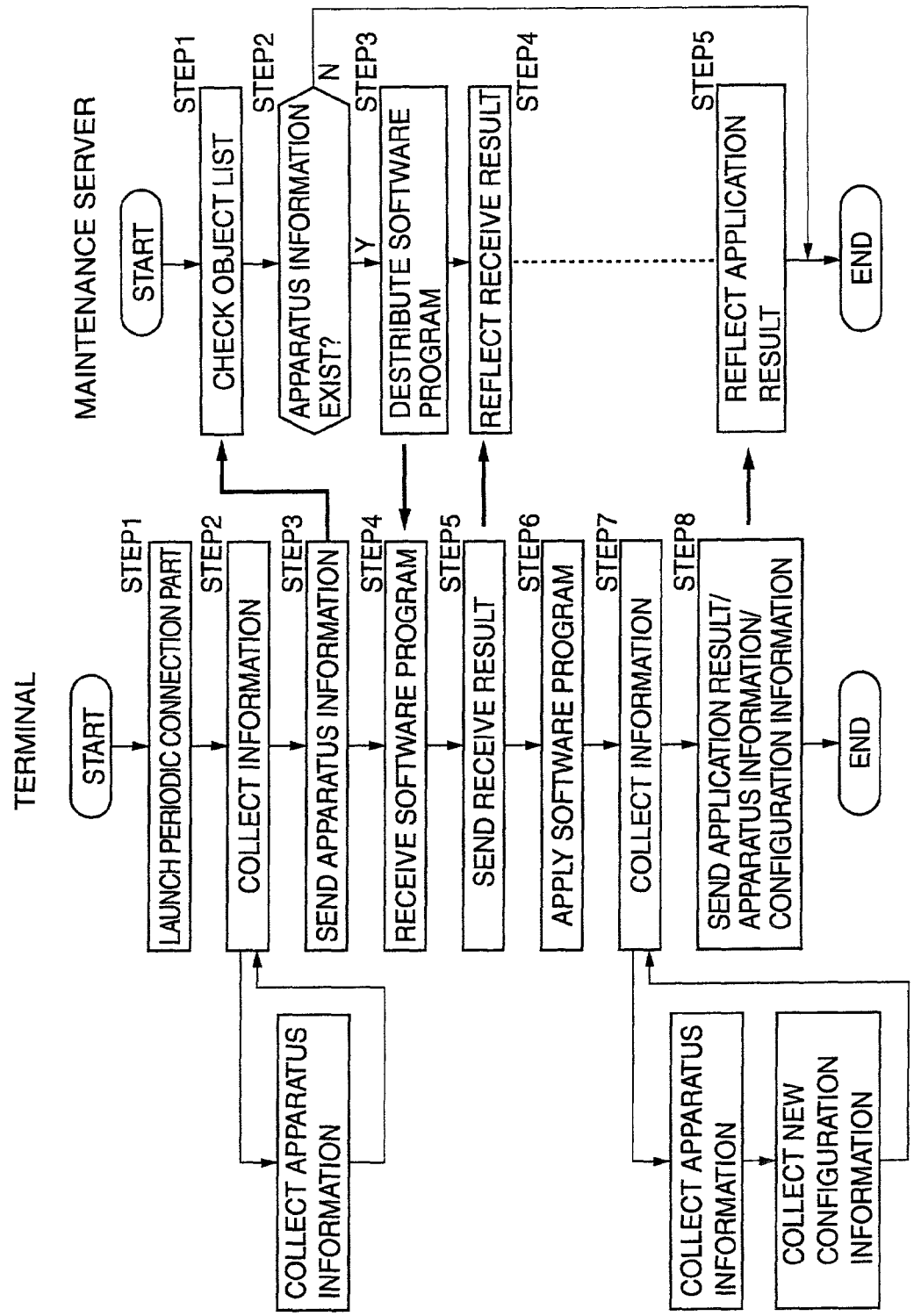
FIG. 15 shows a process of the present invention.

FIG. 15 shows a flowchart of processes performed in this embodiment.

The terminal 10 connects to the maintenance server 30 by using the periodic connection part 19 at predetermined time and collects the apparatus information 300 for identifying the terminal 10 by using the information collection part 15.

As for the periodic connection part 19, the connection period is set by interacting with the user on setting screen shown in FIG. 16. Next, the terminal 10 sends the collected apparatus information 300 to the maintenance server 300 via the network 80 by using the send part 21.

When receiving the apparatus information, the maintenance server 30 checks whether the received apparatus information has been registered in the object list 700 (shown in FIG. 14A) by using the object list checking part 41. When the apparatus information has been registered, it is necessary to distribute the registered software program 600 which is indicated by the apparatus information. Thus, the maintenance server 30 sends the registered software program 600 to the terminal 10 which sent the apparatus information by using the send part 33.

Then, the terminal 10 receives the software program 600 sent from the maintenance server 30 by using the receive part 22. Next, the terminal 10 sends a receive result to the maintenance server 30 by using the send part 21. The maintenance server 30 stores distribution state of the software program 600 by using a distribution monitoring part 42.

Figure 17:
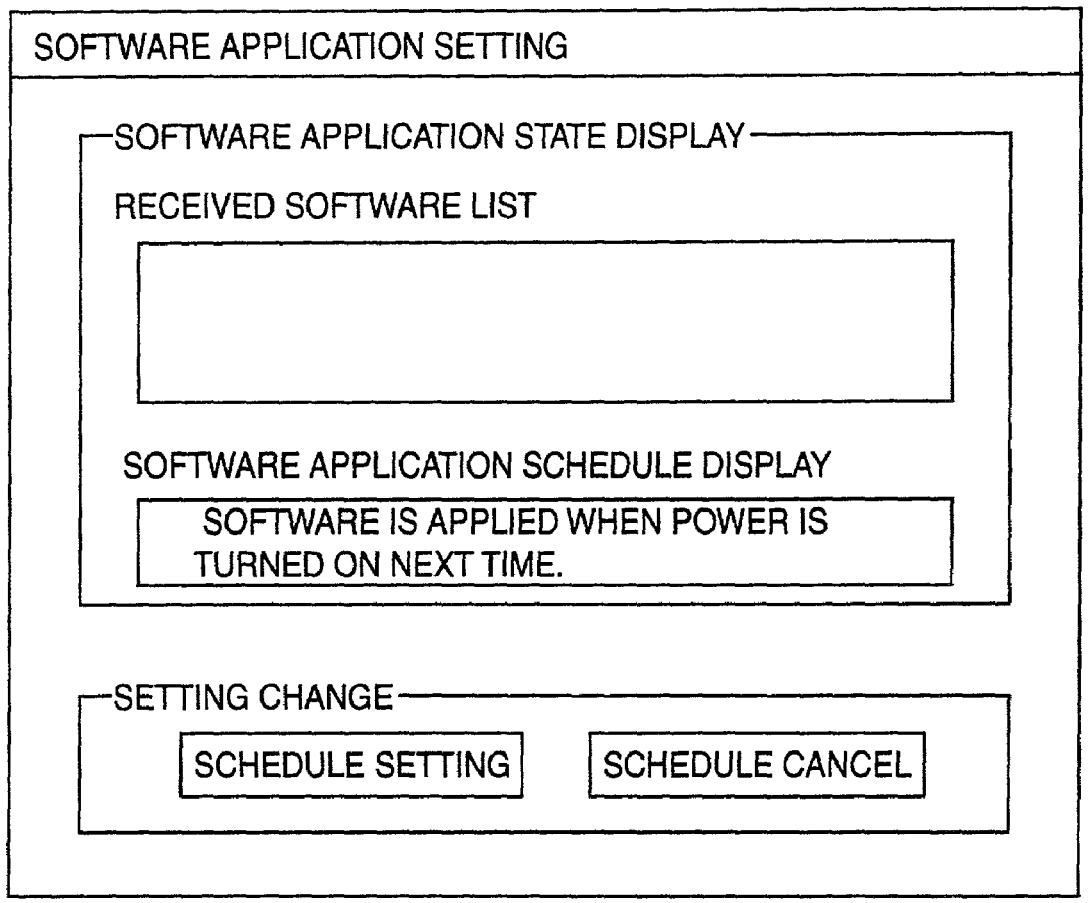
FIG. 17 shows a screen for setting application of software programs.

The software program 600 which is downloaded in the terminal 10 like the above-mentioned way is applied in the terminal 10 by the software application part 20 according to a timing specified by the user by using a setting screen shown in FIG. 17, wherein a timing such as apply immediately, apply when the system is launched on Monday or the like can be selected. Then, the software program 600 enters in an execution state.

Although it is assumed that same timing is set to every received software program as for the setting screen shown in FIG. 17, the screen may be configured such that various timings can be set according to types of the software programs and the like.

After the software program is applied to the terminal 10 by the software application part 20, the terminal 10 collects the apparatus information 300 for identifying the terminal 10 and configuration information of hardware and software after maintenance process by using the information collection part 15. Then, the terminal 10 sends the application result, the apparatus information 300 and the configuration information to the maintenance server 30 via the network 80. After receiving these information, the maintenance server 30 stores the application state of the software program by using the application monitoring part 43.

According to the present invention, the software program 600 in which the version is upgraded can be distributed to the terminal 10 efficiently. Although distribution of the software program 600 is performed when the terminal 10 connects to the maintenance server 30, the software program 600 can also be distributed when the maintenance server 30 connects to the terminal 10.

The software programs are distributed by the above-mentioned way. For example, when the maintenance server 30 distributes the software program before the terminal 10 collects and sends configuration information due to change of hardware configuration, the distributed software program may be not necessary or should not be used in some cases for the reason that configuration information stored in the maintenance server 30 which was used for judgment of distribution is different from configuration information of the terminal 10.

Therefore, in the present invention, the maintenance-server 30 checks whether configuration information of the terminal 10 and the newest configuration information stored in the maintenance server 30 is the same by using the configuration information ID stored in the terminal 10, the newest configuration information ID stored in the maintenance server 30 and the object list 700 (shown in FIG. 14A) which describes software list to be distributed. After that, the maintenance server 30 distributes only necessary software program. In addition, when distribution of a software program waiting to be applied by the terminal 10 is stopped by the maintenance server 30 due to version up of the software program, the waiting state is released.

Figure 18:
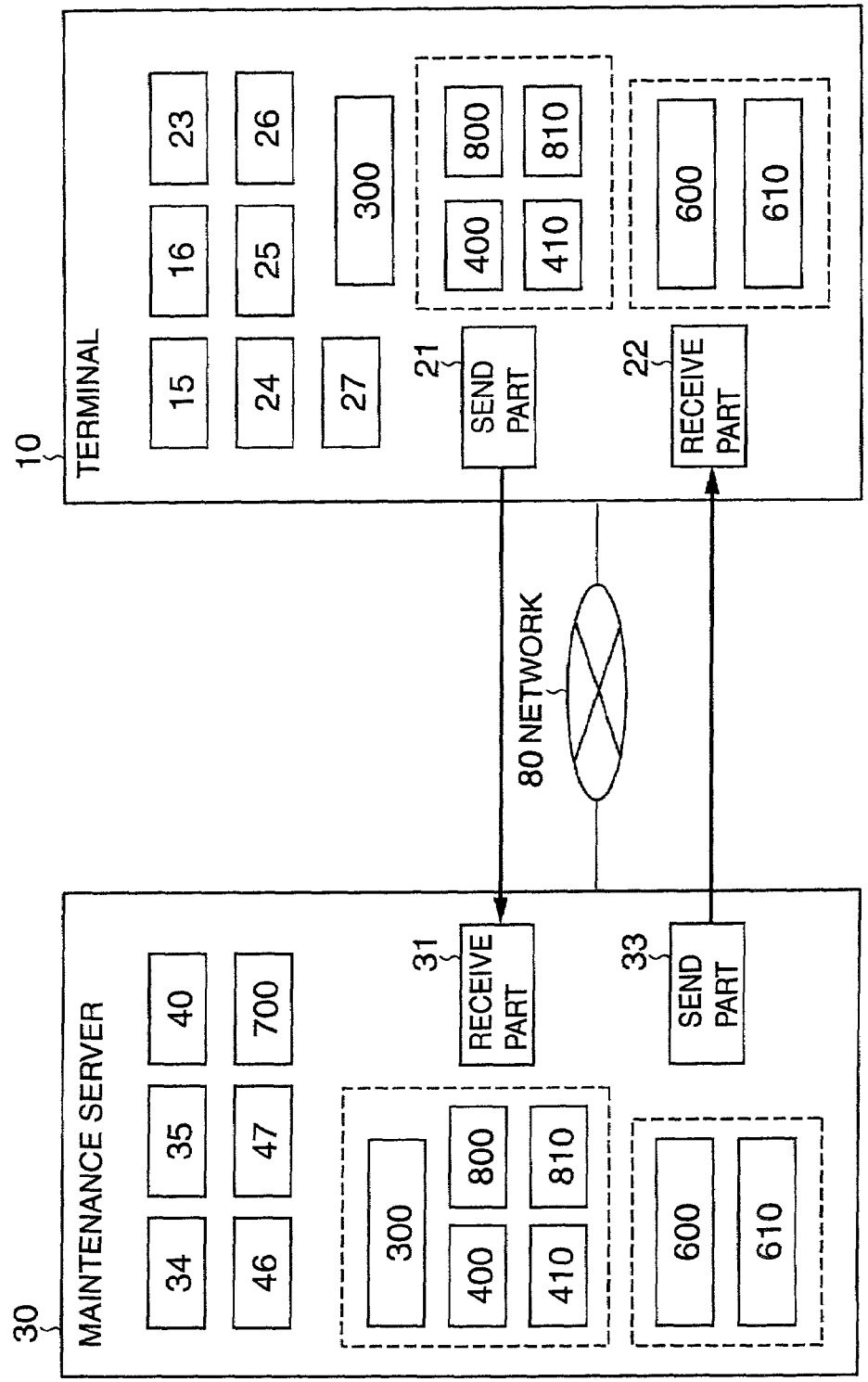
FIG. 18 shows an embodiment of the present invention.

FIG. 18 shows an embodiment of the present invention for realizing the process. In FIG. 18, the same reference numerals are used to identify features corresponding to those in FIG. 1, FIG. 5 and FIG. 13.

As shown in the figure, the terminal 10 includes an information collection part 15, a configuration change checking part 16, a send part 21, a receive part 22, a software distribution request part 23, a software delete part 24, a configuration information ID checking part 25, a software list checking part 26, a software application waiting part 27 and apparatus information 300.

The maintenance server 30 includes a receive part 31, a send part 33, an information storing part 34, a generation management part 35, an object list generation part 40, a registration part 46 and a distribution stop part 47.

Specifically speaking, functions of the terminal 10 and functions of the maintenance server 30 are realized by programs. The programs can be stored in a computer readable recording medium such as a semiconductor memory.

According to this embodiment, when the information collection part 15 collects configuration information, the terminal 10 generates a configuration information ID (information including timestamps, versions and the like) which becomes control information of configuration information 400. Then, the terminal 10 updates the newest configuration information ID which is stored and sends the configuration information 400 to the maintenance server 30 via the network 80 with the configuration information ID while keeping correspondence between the configuration information 400 and the apparatus information 300. The maintenance server 30 receives it and stores the configuration information to which the configuration information ID is assigned.

When the new software program 600 in which the version is updated is registered by the registration part 46, as mentioned above, the maintenance server 30 generates the object list 700 which manages destinations of download of the software program by using the object list generation part 40. In order to realize this embodiment, the maintenance server 30 sends, to each terminal 10, pertinent parts (parts relating to the terminals 10 to which the software program is to be sent) of the object list 700 and a configuration information ID 800 of configuration information which is source information on which the pertinent parts of the object list 700 are generated.

When the terminal 10 receives the pertinent parts of the object list 700 and the configuration information ID, the terminal 10 checks whether the stored newest configuration information ID agrees with received configuration information ID by using the configuration information ID checking part 25. When the terminal 10 determines that they are the same, the terminal 10 extracts a software program 600 (which has not been distributed so far) which is not waiting for being applied from software programs which are described in the pertinent part of the received object list by using the software list checking part 26. Then, the terminal 10 requests the distribution of the extracted software program 600 to the maintenance server 30 by using the software distribution request part 23.

Receiving the distribution request, the maintenance server 30 distributes the software program 600 which is requested to the terminal 10 by using the send part 33.

When the terminal receives the software program 600, the terminal 10 sets the software program 600 in an application waiting state according to the timing set from the setting screen shown in FIG. 17 by using the software application waiting part 27. When the timing is set as immediate execution, the software program 600 is applied and executed immediately. When a timing condition for executing the software program 600 is satisfied, the state of the software program 600 is changed from application waiting to execution state.

After that, when configurations of software or hardware is changed in the terminal 10, the terminal 10 creates changed configuration information 410 and the configuration information ID 810 by launching the information collection part 15.

Meanwhile, the maintenance server 30 recreates the object list 700 and sends it to the terminal 10 in such cases when the distribution of the software program is stopped or when a new version software program 610 is newly registered.

In these cases, the changed configuration information 410 and the configuration information ID 810 in the terminal 10 has not been sent to the maintenance server 30, configuration information ID described in the object list 700 which is sent to the terminal 10 is the configuration information ID 800 which was sent before.

Accordingly, when the terminal receives the pertinent part of the object list 700 and the configuration information ID sent from the maintenance server 30, the terminal 10 detects disagreement in configuration information IDs by the configuration information ID checking part 25.

When the terminal detects the disagreement in configuration information IDs, the terminal 10 sends the changed configuration information 410 and the configuration information ID 810 to the maintenance server 30 by using the send part 21 in order to notify the maintenance server that the configuration information is changed.

Then, the maintenance server 30 receives and stores the newest configuration information 410 and the configuration information ID 810 of the terminal 10. Then, the maintenance server 30 recreates the object list 700 according to the new configuration information 410, and, sends the recreated object list 700 and the configuration information ID 810 of the configuration information 410 which is a source for re-creating the object list 700 to the terminal 10.

After the terminal 10 receives the pertinent part of the object list 700 and the configuration information ID 810, then, the terminal 10 determines that the configuration information IDs are the same by configuration information ID checking part 25.

Then, when the terminal 10 recognizes, according to the received object list 700, that the software program 600 which is waiting for being applied is removed from distribution objects due to update to the software program 610, the terminal 10 cancels the application waiting state of the software program 600 by using the software application waiting part 27 or deletes the software program 600 by using the software delete part 24.

Then, the terminal 10 determines, according to the received object list 700, that there is the software program 610 which is not received from the maintenance server 30, and requests distribution of the software 610 to the maintenance server 30 by using the software distribution request part 23.

Receiving the distribution request, the maintenance server 30 distributes the software program 610 which is requested to the terminal 10 by using the send part 33.

When the terminal 10 receives the software program 610, the terminal 10 sets the software program 610 in the application waiting state according to the timing set from the setting screen shown in FIG. 17 by using the software application waiting part 27.

After that, for example, when a case occurs where the software program 610 disappears for some reasons in the terminal 10, the terminal 10 requests distribution of the software program 610 according to the object list 700 sent from the maintenance server 30. Then, the terminal 10 receives the software program 610 sent in response to the request, and sets the software program 610 in application waiting state for applying the disappeared software again.

While a configuration is adopted in which the terminal 10 determined whether the configuration information IDs are the same in this embodiment, a following configuration can also be adopted. That is, the terminal 10 periodically sends, for example, apparatus information and configuration information ID to the maintenance server 30, and, the maintenance server 30 determines whether the configuration information IDs are the same. When the maintenance server 30 detects disagreement, the terminal 10 sends the configuration information to the maintenance server 30.

As mentioned above, according to the present invention, a configuration is realized in which the maintenance server 30 can grasp configuration information of each terminal 10 accurately.

Specifically speaking, this configuration is realized such that, when user information is registered from the terminal 10, the maintenance server 30 obtains configuration information of the initial configuration of the terminal 10. After that, the maintenance server 30 obtains configuration information of the terminal 10 every time the configuration of the terminal 10 is changed. Then, the maintenance server 30 checks whether the configuration information of the terminal 10 is different from that stored in the maintenance server by using the configuration information ID. When, they are different, the maintenance server obtains configuration information of the terminal 10 at the time.

In addition, according to the present invention, by performing generation management of the configuration information of each terminal 10 which is grasped accurately by the maintenance server 30, a configuration in which searching for failure causes can be performed easily is realized.

To realize this configuration, specifically speaking, the maintenance server 30 performs generation management of configuration information obtained from the terminal 10, and extracts difference information between configuration information at the time of failure of the terminal 10 and the generation managed configuration information, and outputs the difference information.

Since there are many cases where failure of hardware or software of the terminal 10 is due to combination of software programs, combination of software and hardware and the like, the search for the cause of failure becomes easy by using the difference information.

In addition, according to the present invention, a configuration is realized in which the maintenance server grasps configuration information of each terminal 10 accurately, and distributes software programs which are changed due to failure and the like efficiently by using the configuration information.

To realize this configuration, specifically speaking, when a new software program is generated, the maintenance server 30 searches for terminals 10 which have a series to which the software program is applied according to configuration information of each terminal 10. Then, the maintenance server 30 searches the searched terminals 10 for terminals 10 which have the software program. After that, the maintenance server 30 searches the searched terminals 10 for terminals 10 which have the older version software program than the software program so that the maintenance server prepares a list of the terminals 10 to which the software program is distributed.

Then, when distribution of a software program is requested by the terminal 10, the maintenance server 30 determines and distributes the software program by searching the list. Or, the maintenance server notifies the terminals 10 of the list, and, when distribution of a software program is requested by the terminals 10 in response to the notification, the maintenance server distributes the software program.

In addition, according to the present invention, a configuration is realized in which software programs can be applied in the way the user wishes. This configuration is realized by the way in which the terminal 10 sets the application waiting state or the immediate execution state for resources distributed from the maintenance server 30. Then, the terminal 10 controls timing of application of the resources distributed from the maintenance server 30 on the basis of the settings. In addition, when a software program which is in the application waiting state becomes unnecessary, the terminal 10 releases the waiting state.

In addition, according to the present invention, a configuration is realized in which skill of each maintenance worker or level of each service company can be evaluated objectively and speedily.

To realize this configuration, the maintenance server 30 collects and compiles date and time information of start and end of maintenance work.

As mentioned above, according to the present invention, the cause of failure of terminals connected to a network can be searched speedily. In addition, according to the present invention, resources to be downloaded can be downloaded speedily to each terminal connected to a network. In addition, according to the present invention, configuration information of terminals at the time of failure and configuration information before the failure can be obtained accurately and easily. In addition, according to the present invention, application of resources can be controlled in the way the user wishes. Further, according to the present invention, skill of each maintenance worker or level of each service company can be evaluated objectively and speedily.

The present invention is not limited to the specifically disclosed embodiments, and variations and modifications may be made without departing from the scope of the invention.

What is claimed is:

1. A remote maintenance apparatus used for maintenance of terminals connected to a network, comprising:
   a first obtaining part which obtains configuration information, of hardware and software of terminals, sent from said terminals through said network;
   a storing part which stores said configuration information, of hardware and software obtained by said first obtaining part, while bringing said configuration information of hardware and software into correspondence with generation information;

a second obtaining part which obtains configuration information of hardware and software of a failed terminal, among said terminals, which is associated with failure information which is sent from said failed terminal through said network, or, which obtains configuration information of hardware and software of said failed terminal by identifying newest configuration information of hardware and software of said failed terminal which is stored in said storing part;

an extraction part which extracts difference information between configuration information obtained by said second obtaining part and configuration information stored in said storing part and displays the difference information for the purpose of performing maintenance work in said failed terminal; and a generation part which generates evaluation information of the maintenance work performed in said failed terminal based on a dispatching time and a maintenance work time.

2. The remote maintenance apparatus as claimed in claim 1, further comprising:

an issuing part which issues, to a terminal, an instruction for said terminal to send configuration information when a configuration information ID sent from said terminal is not the same as the newest configuration information ID which is stored in said storing part; and wherein said first obtaining part obtains configuration information sent in response to said instruction.

3. The remote maintenance apparatus as claimed in claim 1, further comprising:

a collection part which collects start date and time information, and, end date and time information of the maintenance work performed in said failed terminal, wherein the evaluation information of the maintenance work is generated from said date and time information collected by said collection part.

4. A computer readable storage medium storing program code controlling a computer to perform processes of a remote maintenance apparatus used for maintenance of terminals connected to a network, by:

obtaining configuration information of hardware and software of terminals sent from said terminals through said network;

storing said obtained configuration information of hardware and software;

accessing said stored configuration information of hardware and software and bringing same into correspondence with generation information;

further obtaining configuration information of hardware and software of a failed terminal, among said terminals, which is associated with failure information which is sent from said failed terminal through said network, or further obtaining configuration information of hardware and software of said failed terminal by identifying newest, stored configuration information of hardware and software of said failed terminal;

extracting difference information between configuration information obtained by said further obtaining and displaying in the difference information for the purpose of performing maintenance work in said failed terminal; and evaluating information of the maintenance work performed in said failed terminal based on a dispatching time and a maintenance work time;

wherein the remote maintenance apparatus can simultaneously manage configuration information of hardware and software of a plurality of said terminals.

5. A method of performing remote maintenance of an apparatus used for maintenance of terminals connected to a network, comprising:

obtaining and storing configuration information, of hardware and software of terminals, sent from said terminals through said network;

further obtaining configuration information of hardware and software of a failed terminal, among said terminals, which is associated with failure information which is sent from said failed terminal through said network, or obtaining configuration information of hardware and software of said failed terminal by identifying the stored configuration information of hardware and software of said failed terminal;

extracting difference information between the further obtained configuration information of said failed terminal and the stored configuration information of said failed terminal and displaying the difference information for the purpose of performing maintenance work in said failed terminal; and generating evaluation information of the maintenance work performed in said failed terminal based on a dispatching time and a maintenance work time.

* * * * *

UNITED STATES PATENT AND TRADEMARK OFFICE
CERTIFICATE OF CORRECTION

PATENT NO. : 7,343,401 B2  Page 1 of 1
APPLICATION NO. : 09/813962
DATED : March 11, 2008
INVENTOR(S) : Ikuko Tachibana et al.

It is certified that error appears in the above-identified patent and that said Letters Patent is hereby corrected as shown below:

Column 18, Line 14, after "displaying" delete "in".

Signed and Sealed this

Fifth Day of August, 2008

JON W. DUDAS
*Director of the United States Patent and Trademark Office*